US008469450B2

(12) United States Patent  
Wahls et al.

(10) Patent No.: US 8,469,450 B2  
(45) Date of Patent: *Jun. 25, 2013

(54) ADJUSTABLE VEHICLE SEAT SUSPENSION

(75) Inventors: Robert J. Wahls, Pinckney, MI (US); Ronald Uecker, Slinger, WI (US)

(73) Assignee: Milsco Manufacturing Company, a Unit of Jason Incorporated, Milwaukee, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/493,519

(22) Filed: Jun. 11, 2012

(65) Prior Publication Data  
US 2012/0241587 A1 Sep. 27, 2012

Related U.S. Application Data

(63) Continuation of application No. 12/326,057, filed on Dec. 1, 2008, now Pat. No. 8,197,004.

(51) Int. Cl.  
B60N 2/18 (2006.01)

(52) U.S. Cl.  
USPC .................................. 297/344.17; 297/344.1

(58) Field of Classification Search  
USPC .................. 297/344.1–344.17; 267/131, 133  
See application file for complete search history.

(56) References Cited

U.S. PATENT DOCUMENTS

| 2,531,572 | A | 11/1950 | Knoedler |
| 3,150,855 | A | 9/1964 | Carter et al. |
| 3,743,230 | A | 7/1973 | Freedman |
| 3,788,697 | A | 1/1974 | Barton et al. |
| 4,026,601 | A | * 5/1977 | Dill et al. .................... 297/344.1 |
| 4,047,759 | A | 9/1977 | Koscinski |
| 4,289,351 | A | 9/1981 | Wahls |
| 4,382,573 | A | 5/1983 | Aondetto |
| 4,448,386 | A | 5/1984 | Moorhouse et al. |
| 4,461,444 | A | 7/1984 | Grassl et al. |
| 4,640,488 | A | 2/1987 | Sakamoto |
| 4,662,597 | A | 5/1987 | Uecker et al. |
| 4,687,250 | A | 8/1987 | Esche |
| 4,709,963 | A | 12/1987 | Uecker et al. |
| 4,856,763 | A | 8/1989 | Brodersen et al. |
| 5,044,694 | A | 9/1991 | Koa |
| 5,154,393 | A | 10/1992 | Lorbiecki |
| 5,154,402 | A | 10/1992 | Hill et al. |
| 5,169,112 | A | 12/1992 | Boyles et al. |
| 5,176,356 | A | 1/1993 | Lorbiecki et al. |
| 5,364,060 | A | 11/1994 | Donovan et al. |
| 5,388,801 | A | 2/1995 | Edrich et al. |
| 5,520,440 | A | 5/1996 | Lee |
| 5,601,338 | A | 2/1997 | Wahls |

(Continued)

Primary Examiner — Christopher Schwartz  
(74) Attorney, Agent, or Firm — Boyle Fredrickson, S.C.

(57) ABSTRACT

An adjustable seat suspension for a vehicle seat that includes a linkage arrangement disposed between a seat frame and seat base whose collapse is opposed by a spring lever arm linkage arrangement supported on a fluid powered spring actuator carried by the base that has a plurality of pivotable spring lever arms that are each coupled to a portion of the frame. In a preferred embodiment, the fluid powered spring actuator is an air spring whose pressure is adjustable and which is powered by an air compressor to tailor suspension characteristics and provide a desired preload. The base includes an upright to which the spring lever arm linkage arrangement is pivotally mounted with its spring lever arms supported by a saddle carried by the air spring at a location disposed between the upright and where the spring lever arms couple with the seat suspension.

56 Claims, 5 Drawing Sheets

U.S. PATENT DOCUMENTS

| | | |
|---|---|---|
| 5,799,922 A | 9/1998 | Timms et al. |
| 5,871,198 A | 2/1999 | Bostrom et al. |
| 5,975,508 A | 11/1999 | Beard |
| 6,186,467 B1 | 2/2001 | Wahls |
| 6,193,297 B1 | 2/2001 | Vandermolen |
| 6,237,889 B1 | 5/2001 | Bischoff |
| 6,357,830 B1 | 3/2002 | Ratza et al. |
| 6,550,740 B1 | 4/2003 | Burer |
| 6,616,117 B2 | 9/2003 | Gryp et al. |
| 6,830,297 B2 | 12/2004 | Gordon |
| 6,886,650 B2 | 5/2005 | Bremner |
| 6,935,693 B2 | 8/2005 | Janscha et al. |
| 6,945,505 B2 | 9/2005 | Hohnl et al. |
| 7,032,874 B2 | 4/2006 | Meyers et al. |
| 7,510,240 B2 | 3/2009 | Jones et al. |
| 7,571,886 B2 | 8/2009 | Carter |
| 8,197,004 B2 * | 6/2012 | Wahls et al. ............ 297/344.17 |
| 2003/0038221 A1 | 2/2003 | Fu et al. |
| 2007/0029854 A1 * | 2/2007 | Robinson ................ 297/344.17 |
| 2009/0189407 A1 | 7/2009 | Lewis, II |

* cited by examiner

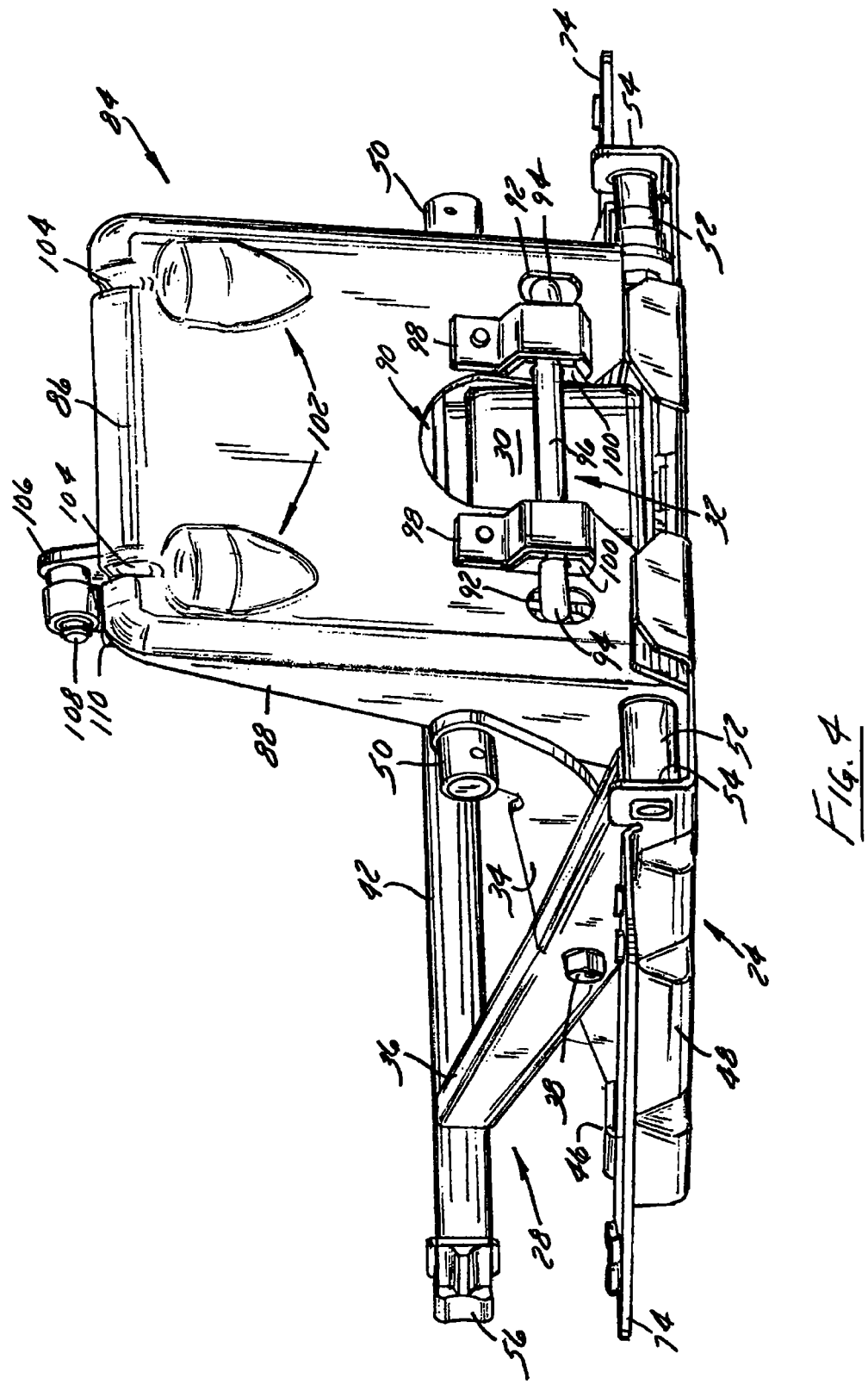

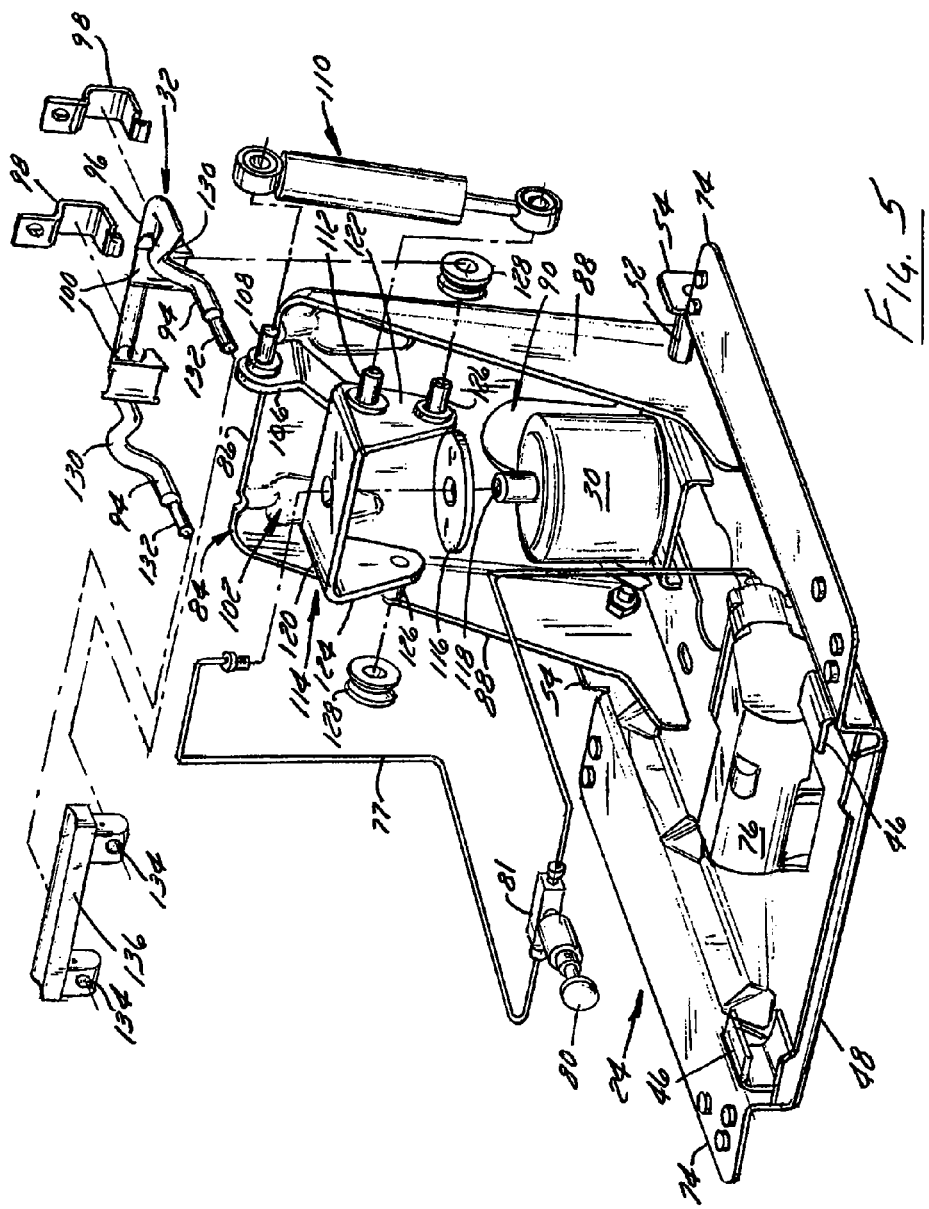

ADJUSTABLE VEHICLE SEAT SUSPENSION

CROSS-REFERENCE TO RELATED APPLICATION

This application is a continuation of application Ser. No. 12/326,057 filed Dec. 1, 2008, which issued Jun. 12, 2012 as U.S. Pat. No. 8,197,004.

FIELD

The present invention relates to adjustable seat suspensions, particularly for vehicles including off-road vehicles, which provides a supporting biasing force that is adjustable over a wide weight range and more particularly to an adjustable seat suspension capable of doing so using a fluid-powered drive arrangement.

BACKGROUND

Off road equipment such as lift trucks, skid steer loaders, compact excavators, and the like, often utilize a spring supported seat to isolate the seat occupant from vibration during vehicle operation. Such cushioning usually utilizes extension or compression springs which support the occupant's weight. However, because the range of the seat occupant's weight is often in excess of 150 pounds and because of the relatively confined space in these types of vehicles available for the seat, it is not only difficult to configure a seat suspension that fits in such a small space but it is also a challenge to "tune" a spring supported seat suspension to provide optimum comfort. Accordingly, it has been known to employ seat suspensions utilizing extension or compression springs wherein the biasing force imposed by the springs on the seat structure is adjustable.

U.S. Pat. No. 5,601,338 discloses a vehicle seat structure that includes a mechanical spring type adjustable vehicle seat suspension. In this patent, the seat is pivoted at its forward edge, and the rear edge is supported by a pair of extension springs. An adjustable slide located upon a lever arm is interposed between the springs and the rear seat portion where the position of the slide is adjusted to vary the extent of spring biasing force by changing the location of the application of the biasing force relative to the lever. While this adjustable seat suspension construction enables adjustment for a wide weight range of vehicle operators, only the forward pivoting seat bottom is suspended, which reduces the effectiveness of the suspension system and results in relative motion between the occupant and seat backrest. This can cause a vehicle operator to experience unwanted discomfort during use and operation.

U.S. Pat. No. 6,186,467 discloses an improved adjustable mechanical spring type seat suspension where the entire seat frame is mounted on a scissors linkage and supported by the suspension. By linking the seat frame to the suspension, both the seat back and seat bottom move in unison during suspension operation, comfort is enhanced because both occupant support and vibration isolation is improved. The vehicle suspension is also adjustable such that it can be adjusted for a limited range of vehicle operator weights.

While these compact mechanical spring type vehicle seat suspensions provide relatively low collapsed height, are compact in size, and are relatively economical in cost and maintenance, improvements nonetheless remain desirable. For example, vehicle operator adjustment of a mechanical spring type seat suspension can be challenging, particularly while the vehicle operator is sitting. In addition, as the vehicle operator weights continue to increase, mechanical spring type seat suspensions are not readily configurable to provide support and enable adjustment over an increasingly wider weight adjustment range.

What is needed is an improved vehicle seat suspension which is well suited for use in vehicle seat suspension application where a low seat index point (SIP) is required or desired, which offers improved ease of adjustment along with a greater adjustment range, and which is adaptable for use in a wide variety of seating applications.

SUMMARY

The present invention is directed to a vehicle seat equipped with a suspension that is coupled to and which resiliently supports a frame of the seat. The suspension includes a fluid powered actuator, such as an air spring, which cooperates with a spring lever arm linkage operatively coupled to the seat frame. The air spring is carried by a seat base that has an upright extending upwardly and rearwardly of the air spring and at least a portion of the seat frame. The spring lever arm linkage is generally U-shaped, having a rod that is pivotally mounted to the upright and a pair of spring lever arms that extend outwardly along either side of the air spring which are coupled to a portion of the seat frame. The air spring is operatively connected to each spring lever arm at a location between where the spring lever arm linkage pivotally mounts to the upright and where the spring lever arms couple to the seat frame. In a preferred embodiment, a generally U-shaped spring saddle mounts on the spring and has a pair of downwardly extending arms that each carry a roller upon which a curved section of a corresponding spring arm rides helping to ensure vertical air spring translation during suspension operation.

A fluid powered drive, such as an air compressor, is in fluid flow communication with the fluid powered actuator. Where the fluid powered drive is an air compressor and the fluid powered actuator is an air spring, at least one conduit is employed to communicate air from the air compressor to the air spring. In a preferred embodiment, a manipulable control is used to control inflation and/or deflation of the air spring, such as by controlling air compressor operation and/or venting of air from the air spring. In a preferred embodiment, the manipulable control is a knob that can be manipulated by seat occupant while seated to adjust air pressure in the air spring, such as for increasing or decreasing preload. As a result, weight adjustment is enabled.

The suspension can include a damper, such as a hydraulic cylinder type damper, that extends between the spring saddle and the upright. Such a damper arrangement can be configured to provide vertical translation during suspension operation in a manner where the telescoping rod of the damper is extended at a velocity proportional to the velocity of the seat frame, thereby exerting an upward force on the seat frame and seat occupant. The suspension also includes a linkage arrangement that is disposed between the base and the seat frame that cooperates with other components of the suspension to facilitate relative movement between the seat frame and base during operation. In a preferred embodiment, the linkage arrangement is a scissors linkage arrangement that includes a pair of scissors linkages that are spaced apart and operatively connected to the seat frame and base.

In a preferred embodiment, each spring lever arm extends outwardly from the upright and has a portion that overlies a corresponding roller carried by the spring saddle mounted on the air spring and another portion at or adjacent its free end that underlies part of a bottom seat frame supporting the seat frame thereon. In a preferred embodiment, an end of each spring lever arm engages a cradle that underlies a transversely extending cross brace of the bottom seat frame. Such a cradle can be formed of one or more pads fixed to the cross brace and configured to receive or otherwise engage a portion of the free end of a corresponding spring lever arm. During suspension operation, an upward biasing force of the air spring acting on each spring lever arm imposes an upward biasing force upon the seat frame providing resilient support for the seat frame and a seat occupant that also opposes scissors arm linkage collapse.

A suspension constructed in accordance with the present invention employs a seat frame assembly that is an integral part of the suspension assembly. The seat frame is directly coupled to the seat base by the scissors linkage arrangement with each spring lever arm acting directly upon the seat frame assembly as a result of being upwardly biased by the air spring carried by the seat base. By coupling the seat frame directly to the scissors linkage, a secondary seat frame mounting plate commonly used in "under the seat" vehicle seat suspensions of relatively low profile vehicle seat constructions is eliminated. In addition, this arrangement advantageously provides an integrated seat and suspension assembly having a low seat index point (SIP) that is capable of replacing a standard static, non-suspended seat suspension in many applications.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

DRAWINGS DESCRIPTION

Preferred exemplary embodiments of the invention are illustrated in the accompanying drawings in which like reference numerals represent like parts throughout, and in which.

Figure 1:
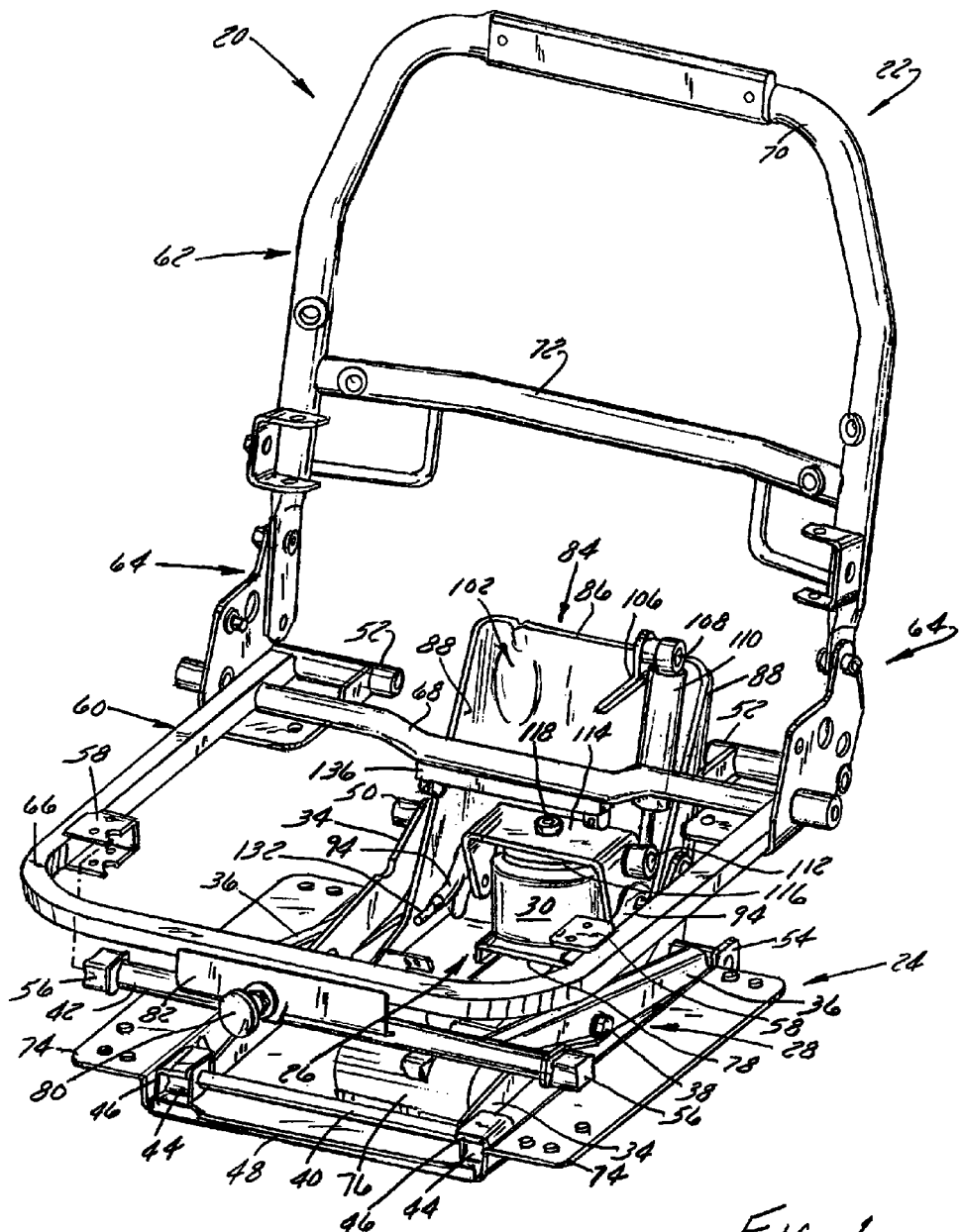
FIG. 1 is a front perspective exploded view of a vehicle seat equipped with a seat suspension constructed in accordance with the present invention that resiliently supports a seat frame of the seat.

FIG. 4 a rear perspective view of the seat base and seat suspension; and

FIG. 5 is a front perspective exploded view of the seat suspension.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-5 illustrate a vehicle seat 20 without any seat cushions shown that includes a seat frame 22 coupled to a base 24 by a preferred embodiment of a vehicle seat suspension 26 that is constructed in accordance with the present invention. The suspension 26 includes a scissors linkage arrangement 28 interposed between the frame 22 and the base 24 and a fluid powered biasing arrangement 30 carried by the base 24 that operatively cooperates with a spring lever arm linkage arrangement 32 that engages the frame 22 in a manner that opposes scissor linkage collapse and that supports a seat occupant sitting in the seat 20. A vehicle seat suspension 26 constructed in accordance with the present invention advantageously not only improves ease of adjustability, it also is capable of supporting seat occupants, e.g., vehicle operators, having a greater range of weights. Such a vehicle seat suspension 26 is advantageously well-suited for use in a wide variety of vehicles, including off-road vehicles, watercraft, and the like.

The scissors linkage 28 includes a pair of spaced apart and fore-aft extending scissors links that each has an inner scissors arm 34 and an outer scissors arm 36 connected by a pivot 38 that allows relative rotation therebetween. The inner scissors arms 34 are interconnected by a transversely extending rod 40 disposed adjacent to the front of the seat 20. Likewise, the outer scissors arms 36 are also interconnected by a transversely extending rod 42. Each inner scissors arm 34 has a lower end pivotally received in a bearing block 44 held captive in a retainer channel 46 attached to a pan or plate 48 of the base 24 adjacent the front of the seat 20. Each inner scissors link arm 34 has an upper end equipped with an outturned pivot 50 that is rotatively coupled to a bearing tube 52 that extends inwardly from part of the seat frame 22. Each outer scissors link arm 36 has a lower end that is held pivotally captive by a tab 54 that extends upwardly from the base plate 48. Each outer scissors link arm 36 has an upper end that is pivotally received in a bearing block 56 held captive in a retainer channel 58 attached to part of the seat frame 22 adjacent the front of the seat 20. It will be appreciated that the scissors linkage 28 can be operatively connected to the seat frame 22 and base 24 using a different configuration than that discussed above and shown in the drawing figures.

Figure 2:
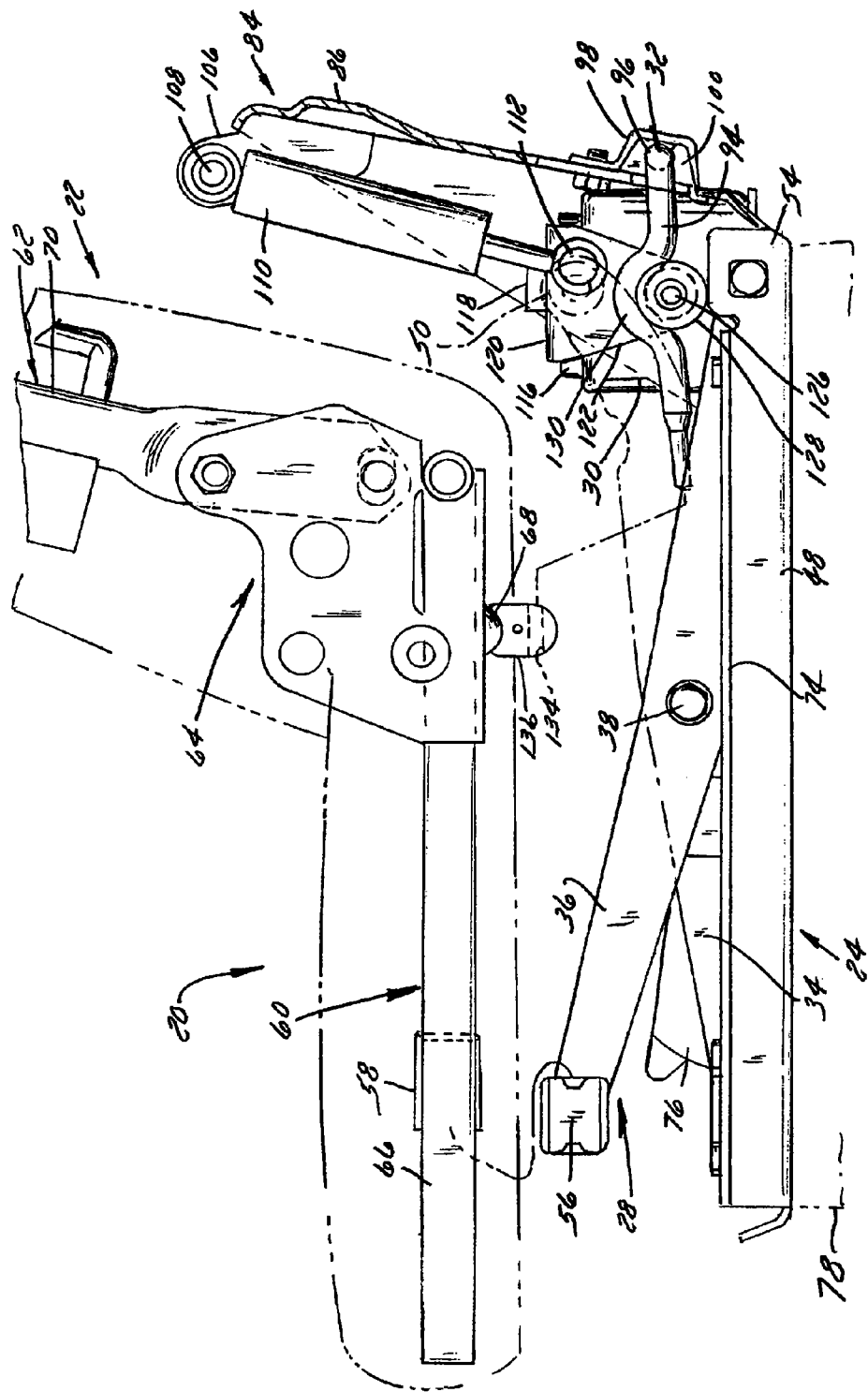
FIG. 2 is a fragmentary side elevation view of the seat frame exploded from a seat base that carries the seat suspension with a portion of a seat suspension upright sidewall removed for clarity.

The seat frame 22 is shown in FIGS. 1 and 2 as having a bottom seat frame 60 that generally underlies the thighs and buttocks of a seat occupant (not shown) and a seat back frame 62 connected to the bottom seat frame 60 by a pair of hinge brackets 64 that permit the seat back to be folded or otherwise pivoted forwardly. The bottom seat frame 60 also includes an outer frame rail 66 interconnected by at least one brace 68 defining a bottom seat frame 60 that is also capable of supporting a seat cushion (shown in phantom in FIG. 2). The seat back frame 62 includes an outer frame rail 70 interconnected by at least one brace 72 defining a seat back frame 62 that can support a seat back cushion (not shown). While the frame rails and interconnecting braces of the seat frame 22 are shown in FIGS. 1 and 2 as being of tubular construction, it should be appreciated that other frame rail and brace types and configurations can be used. It also should be noted that other seat frame configurations can also be used.

The base plate 48 is grounded to the chassis or frame of the vehicle (not shown) in which the vehicle seat 20 is mounted. The base plate 48 is shown in the drawing figures as being equipped with a pair of outwardly extending flanges 74, each of which is adapted for receiving a seat slide (not shown) or another type of fore-aft adjustment device. Where equipped with seat slides, each seat slide grounds the base 24 to the vehicle chassis or frame in a manner that permits fore-aft seat position adjustment. An example of such a seat base plate equipped with seat slides is disclosed in commonly owned U.S. Pat. No. 6,186,467, the entire disclosure of which is hereby expressly incorporated herein by reference. Where seat slides are not used, the base plate 48 can be directly grounded to the vehicle chassis or frame, such as by being directly attached thereto. For example, the base plate 48 can be attached using fasteners (not shown), such as bolts, rivets, or the like.

Inboard of the base plate flanges 74 adjacent the front of the seat 20 is a fluid powered drive 76 that is connected by a conduit 77 (FIG. 5) to the fluid powered biasing arrangement 30, which is shown mounted on a pedestal 78 attached to the base plate 48. In a currently preferred embodiment, the fluid powered biasing arrangement 30 is an air spring and the fluid powered drive 76 is an air compressor. The air compressor 76 is electrically powered, such as by being connected to an electrical system of the vehicle. Adjustment of the pressure of the air in the air spring 30 can be performed by a seat occupant while sitting in the seat 20 via an adjustment knob 80 mounted to a plate 82 carried by a front portion of outer frame rail 66.

In a preferred embodiment, such as is depicted in FIG. 5, manipulation of the adjustment knob 80, such as by rotation or displacement of the knob, configures a valve 81 disposed fluid flow communication, e.g., in conduit 77, between the air compressor 76 and the air spring 30 in a manner that selectively increases or decreases inflation and/or pressure of the air spring 30. In this manner, adjustment can be performed to increase or decrease the amount of resistance the air spring 30 provides in resisting collapse of the scissors linkage 28 in response to a load applied to the suspension 26 thereby correspondingly increasing or decreasing the amount of suspension preload.

Due to the relative ease by which the adjustment knob 80 can be manipulated by a seat occupant, including in particular when they are seated, a suspension 26 constructed in accordance with the present invention advantageously improves ease of spring preload or weight adjustment over the prior art. In addition, due to the increased capacity of the air spring 30, a greater range of preload or weight adjustability is provided thereby producing a suspension 26 constructed in accordance with the present invention that advantageously is able to provide suspension support to seat occupants having a greater weight range than the prior art. For example, in one preferred embodiment, the air spring 30 is selected to provide suspension support to a seat occupant having a weight greater than 350 pounds. In another preferred embodiment, the air spring is selected to provide suspension support to a seat occupant having a weight as much as or greater than 400 pounds.

Inboard and adjacent each upturned scissors linkage pivot receiving tab 54 is a suspension supporting upright 84 that extends upwardly from the base plate 48 adjacent the rear of the seat 20. In the preferred embodiment shown in the drawing figures, the upright 84 is fixed to the base plate 48. The upright 84 includes a generally vertically extending rear wall 86 and a pair of tapered edge sidewalls 88 that generally encircle or encompass the air spring 30. With specific reference to FIGS. 3-5, the rear wall 86 of the upright 84 is constructed with a cutout 90 for accommodating a portion of the generally cylindrical air spring 30 located adjacent the wall 86. In addition, the rear wall 86 includes a pair of apertures 92 through which a corresponding spring lever arm 94 of the lever arm linkage 32 forwardly extends. Each aperture 92 is oval or oblong having a length that accommodates the range of vertical pivotal motion of the spring lever arm 94 extending therethrough.

Figure 3:
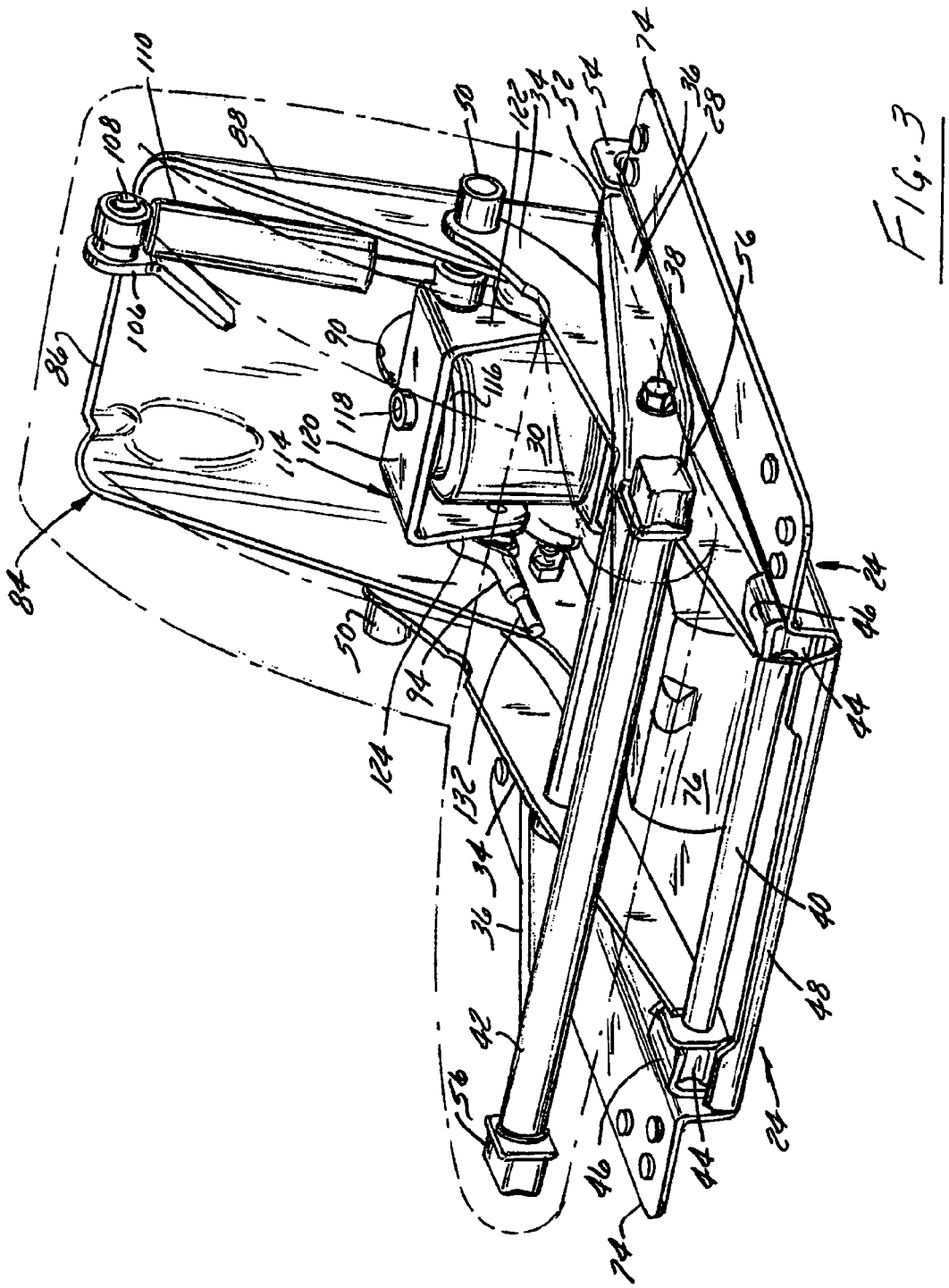
FIG. 3 is a front perspective view of the seat base and seat suspension.

As is also best shown in FIGS. 3-5, each spring lever arm 94 of the lever arm linkage 32 is interconnected by a transversely extending rod 96 defining a lever arm linkage 32 of generally U-shaped construction. The spring lever arm interconnecting rod 96 is pivotally anchored to the rear wall 86 by a pair of bearing straps 98 that each holds the rod 96 captive against a bearing block 100 and the rear wall 86. If desired, the rear wall 86 can also include a pair of spaced apart spring recesses 102 (FIG. 4) formed in it along with mechanical spring hook receiving notches 104 (FIG. 4) thereby enabling the base plate and upright to be used with either the fluid driven seat suspension 26 of the present invention or the extension spring based seat suspension disclosed in commonly owned U.S. Pat. No. 6,186,467 enabling the base to be constructed so as to be advantageously adaptable for use with either type of seat suspension in a common assembly line.

The rear wall 86 of the suspension supporting upright 84 also can be equipped with a forwardly extending damper mounting bracket 106 that has a pivot 108 to which one end of a damper 110 can be pivotally mounted. Where a damper 110 is used, the other end of the damper 110 can be pivotally mounted to a pivot 112 that extends outwardly from a generally U-shaped spring saddle 114 that overlies the top of the air spring 30. During suspension operation, the damper 110 dampens vibration, shocks and bumps communicated to it through the air spring 30 to ground via the upright 84 and base plate 48.

As is shown in FIG. 5, the spring saddle 114 overlies a spacer or washer 116 that overlies the air spring 30 through which an air inlet port 118 extends that is ultimately in fluid flow communication with the air compressor 76. With additional reference to FIGS. 2 and 3, the saddle 114 has a generally horizontal portion 120 that overlies the spacer 116 and ultimately the air spring 30 such that the saddle 114 displaces substantially in unison with the air spring 30, e.g. with spring deflection. The saddle 114 also has a pair of downwardly extending arms 122, 124 with the damper pivot 112 mounted to arm 122. Each saddle arm 122, 124 has an outwardly extending pivot 126 that rotatively carries a roller 128 upon which a corresponding one of the spring lever arms 94 of the spring lever arm linkage arrangement 32 rides. Each spring lever arm 94 can and preferably does have an arcuate roller seating segment 130 that seats on roller 128. This curved roller seating segment 130 of each spring lever arm 94 is configured to advantageously help ensure vertical translation of the air spring 30 during suspension operation. The outer profile or contour of the roller 128 can be and preferably is substantially complementary with the spring lever arm 94, which has a generally circular cross sectional shape.

As is best shown in FIG. 2, the free end of each spring lever arm 94 has a necked down portion 132 that is telescopically receivable in a corresponding one of a pair of spaced apart and generally parallel bores 134 formed in a suspension coupling cradle 136 that is attached to cross brace 68 of the bottom seat frame 60 thereby coupling the seat frame 22 to the suspension 26 in a manner where the entire frame 22 is supported by the suspension 26. While the suspension coupling cradle 136 is shown in the drawing figures as being a single elongate pad, it can also be implemented as a pair of pads.

The suspension coupling cradle 136 preferably is fixed to cross brace 68 and underlies a bottom surface of the cross brace 68 in the manner shown in FIG. 2. The free end 132 of each spring lever arm 94 engages the coupling cradle 136 forwardly of the air spring 30 and a fulcrum of the spring lever arm linkage 32 located where the linkage 32 pivots in the bearing block 100 thereby providing mechanical advantage based upon the length of the moment arm between the pivot point and coupling cradle 136. As a result, vertical displacement of the air spring 30 during suspension operation, such as due to air spring deflection in response to an applied load, a jolt, a bump or the like, correspondingly displaces the seat frame 24 due to its coupling via coupling cradle 136 to each spring lever arm 94. Because of the intermediate location of each roller 128 that underlies and supports part of a corresponding spring lever arm 94, a moment is created by the air spring 30 being captured in compression that opposes a downward moment caused by a seat occupant with the spring 30 being sufficiently compliant enough and having a desired spring rate that desirably reduces the magnitude of such an applied load, jolt or bump. In addition, particularly when this arrangement is used in combination with a damper 110, desirable vibration isolation results from a suspension 26 constructed in accordance with the present invention.

During operation, a vehicle equipped with a vehicle seat 20 having a suspension 26 constructed in accordance with the present invention encounters jolts, bumps and the like that are better dampened and isolated by the suspension. During operation, a downward force due to the weight of a seat occupant sitting on the seat is exerted on or about each end of each spring lever arm 94 produces a moment that is opposed by a force exerted generally in an opposite direction by the air spring 30 being operatively connected to the spring lever arms 94 via the spring saddle 114. Should the downward force exerted at or about the ends of the spring lever arms 94 change, a corresponding rapid increase or decrease in the pressure within the air spring 30 occurs thereby providing a counteracting suspension response. As a result, suspension performance is improved due to increased speed of response and improved isolation. As a result of the ability of the air spring 30 to increase its air pressure in response to an abrupt increase in the applied force, such as due to a jolt, bump or the like, it advantageously automatically and rapidly better isolates them from the seat occupant.

When it is desired to increase suspension preload, adjustment knob 80 is manipulated in a manner that causes the air compressor 76 to supply additional air so as to increase the air pressure within the air spring 30 thereby making the air spring 30 stiffer. While this can also make the suspension 26 stiffer or less compliant, it preferably is used by a seat occupant to better tailor the characteristics of the suspension 26 to the desires of the seat occupant, preferably by providing an adequate amount of weight adjustment for seat occupant comfort. For example, for a seat occupant having a greater weight, increasing air pressure within the air spring 30 advantageously increases preload in a manner that provides better suspension operating characteristics for such a heavier seat occupant. Conversely, the adjustment knob 80 can also be manipulated to release air from the air spring 32, decreasing the air pressure within the air spring 30 to make the air spring more compliant. While this can also make the suspension 26 softer, it preferably can also be used to better tailor the suspension preload for the weight of a lighter seat occupant.

Various alternatives are contemplated as being within the scope of the following claims particularly pointing out and distinctly claiming the subject matter regarded as the invention. For example, while a single air spring is disclosed, more than one air spring can be used. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A vehicle seat suspension comprising:
(a) a seat frame;
(b) a base comprising a generally vertically extending upright;
(c) a suspension linkage in operable cooperation with the base and seat frame;
(d) a fluid powered actuator;
(e) a saddle carried by the fluid powered actuator; and
(f) a lever arm in operable cooperation with the fluid powered actuator that pivots relative to and extends outwardly from the upright with a portion of the lever arm cantilevered outwardly from the saddle, the lever arm communicating a biasing force from the fluid powered actuator opposing collapse of the suspension linkage.

2. The vehicle seat suspension of claim 1 wherein the fluid powered actuator displaces the saddle during suspension operation displacing the lever arm and wherein the lever arm has a non-straight segment supported by part of the saddle that is movable relative to the saddle when the saddle is displaced by the fluid powered actuator.

3. The vehicle seat suspension of claim 2 wherein the non-straight segment is supported by a guide of the saddle.

4. The vehicle seat suspension of claim 3 wherein the guide comprises a pivot.

5. The vehicle seat suspension of claim 4 wherein the guide further comprises a roller that rotatively supports the non-straight segment of the lever arm on the roller.

6. The vehicle seat suspension of claim 5 wherein the non-straight segment is curved.

7. The vehicle seat suspension of claim 3 wherein the guide comprises a roller.

8. The vehicle seat suspension of claim 1 wherein a portion of the lever arm is supported by a guide of the saddle.

9. The vehicle seat suspension of claim 8 wherein the guide comprises a pivot.

10. The vehicle seat suspension of claim 9 wherein the guide further comprises a roller carried by the pivot with the roller supporting the portion of the lever arm supported by the guide on the roller.

11. The vehicle seat suspension of claim 10 wherein the portion of the lever arm cantilevered outwardly from the saddle comprises the portion of the lever arm supported on the roller.

12. The vehicle seat suspension of claim 8 wherein the guide comprises a roller that rotatively supports the portion of the lever arm supported by the guide.

13. The vehicle seat suspension of claim 1 wherein the suspension linkage comprises a scissors arm linkage.

14. The vehicle seat suspension of claim 13 wherein the scissors linkage comprises a pair of spaced apart scissor links that each have one scissor arm pivotally connected to another scissor arm with one of the scissor arms of each one of the scissor links pivotally connected to the upright.

15. The vehicle seat suspension of claim 14 wherein the upright is disposed rearwardly of the seat frame.

16. The vehicle seat suspension of claim 1 wherein the saddle comprises a lever arm carrier from which the outwardly cantilevered portion of the lever arm extends outwardly.

17. The vehicle seat suspension of claim 16 wherein the lever arm carrier supports the lever arm in a manner that enables relative movement therebetween.

18. The vehicle seat suspension of claim 16 further comprising a damper connected at one end to the upright and at an opposite end to the lever arm carrier.

19. The vehicle seat suspension of claim 1 wherein the base extends underneath the seat frame and wherein the fluid powered actuator is mounted on the base adjacent to the upright.

20. The vehicle seat suspension of claim 19 wherein the fluid powered actuator is disposed forwardly of the upright.

21. The vehicle seat suspension of claim 1 comprising a pair of the lever arms that are spaced apart, that are each supported by the saddle, and that are each cantilevered outwardly from the saddle.

22. The vehicle seat suspension of claim 21 wherein the pair of lever arms are interconnected by an elongate connector that is pivotally connected to the upright by a bearing arrangement.

23. The vehicle seat suspension of claim 1 wherein the saddle supports the lever arm in a manner that enables relative movement therebetween.

24. The vehicle seat suspension of claim 23 wherein the saddle rotatively supports the lever arm.

25. The vehicle seat suspension of claim 1 wherein the fluid powered actuator has a fluid inlet port extending outwardly from one end of the fluid powered actuator and wherein the saddle has a generally horizontal portion with an opening in registry with the fluid inlet port when the saddle is carried by the fluid powered actuator.

26. The vehicle seat suspension of claim 25 wherein the generally horizontal portion of the saddle is mounted on one end of the fluid powered actuator.

27. The vehicle seat suspension of claim 1 wherein the saddle comprises (i) a portion carried by one end of the fluid powered actuator and (ii) a lever arm carrier that movably supports a portion of the lever arm and which extends alongside the fluid powered actuator.

28. The vehicle seat suspension of claim 1 wherein the fluid powered actuator comprises an air spring.

29. The vehicle seat suspension of claim 1 wherein the lever arm has a free end that is operably coupled to the seat frame.

30. A vehicle seat suspension comprising:
(a) a seat frame;
(b) a base extending underneath part of the seat frame and having an upright extending upwardly from a rear of the base;
(c) a suspension linkage operatively connected to the seat frame and to the base;
(d) a displaceable fluid powered actuator disposed on the base;
(e) a saddle having one portion carried by an end of the fluid powered actuator and another portion comprising a pair of spaced apart lever arm carrier arms extending outwardly of the fluid powered actuator; and
(f) a pair of spaced apart lever arms pivotally connected to the upright that extend outwardly from the upright with each lever arm supported by a corresponding one of the lever arm carriers enabling relative movement therebetween with a part of each lever arm cantilevered outwardly from a corresponding one of the lever arm carriers.

31. The vehicle seat suspension of claim 30 wherein each lever arm carrier arm comprises a support that operatively supports a corresponding one of the lever arms in a manner enabling relative movement therebetween.

32. The vehicle seat suspension of claim 31 wherein each support comprises a pivot.

33. The vehicle seat suspension of claim 32 wherein each support further comprises a roller.

34. The vehicle seat suspension of claim 33 wherein each lever arm comprises a non-straight segment that rides on the roller.

35. The vehicle seat suspension of claim 34 wherein the non-straight segment of each lever arm comprises a curved segment.

36. The vehicle seat suspension of claim 32 wherein each lever arm comprises a non-straight segment that is supported by the pivot.

37. The vehicle seat suspension of claim 36 wherein the non-straight segment of each lever arm is curved.

38. The vehicle seat suspension of claim 31 wherein each support comprises a roller.

39. The vehicle seat suspension of claim 30 wherein each lever arm has a non-straight segment supported by a corresponding lever arm carrier arm with the non-straight segment movable relative thereto and configured to guide translation of the fluid powered actuator.

40. The vehicle seat suspension of claim 39 wherein the non-straight segment of each lever arm comprises a curved portion.

41. The vehicle seat suspension of claim 30 wherein the pair lever arms are spaced apart by a rod interconnecting the pair of lever arms forming a generally U-shaped spring arm linkage with the rod pivotally mounted to the upright by a bearing arrangement.

42. The vehicle seat suspension of claim 30 further comprising a damper having one end connected to the upright and an opposite end connected to one of the lever arm carrier arms.

43. The vehicle seat suspension of claim 30 wherein the suspension linkage comprises a scissors linkage having a pair of spaced apart scissor links that each have one scissor arm pivotally connected to another scissor arm with one of the scissor arms of each one of the scissor links pivotally connected to the upright.

44. The vehicle seat suspension of claim 30 wherein each lever arm is operably coupled to the seat frame.

45. A vehicle seat suspension comprising:
(a) a seat frame;
(b) a base extending underneath part of the seat frame and having an upright extending upwardly from a rear of the base;
(c) a suspension linkage operatively connected to the seat frame and to the base;
(d) a fluid powered actuator mounted to the base adjacent the upright; and
(e) a lever arm pivotally connected to the upright that extends outwardly from the upright underlying part of the seat frame with the lever arm (i) operatively supported by the fluid powered actuator (ii) extending outwardly beyond the fluid powered actuator, and (iii) movable relative to the fluid powered actuator during displacement by the fluid powered actuator.

46. The vehicle seat suspension of claim 45 wherein the lever arm is operatively supported by the fluid powered actuator by a saddle carried by the fluid powered actuator that is displaceable substantially in unison therewith and wherein one part of the lever arm is supported by the saddle in a manner enabling relative movement therebetween and another part of the lever arm extends outwardly from the saddle beyond the saddle.

47. The vehicle seat suspension of claim 46 wherein the saddle comprises one portion overlying an end of the fluid powered actuator that is displaceable by the fluid powered actuator and another portion comprising a lever arm carrier that supports the lever arm enabling relative movement therebetween during fluid powered actuator displacement.

48. The vehicle seat suspension of claim 47 wherein the lever arm has a non-straight segment in operable cooperation with the lever arm carrier that is configured to guide translation of the fluid powered actuator.

49. The vehicle seat suspension of claim 48 wherein the non-straight segment of the lever arm comprises a curved segment.

50. The vehicle seat suspension of claim 48 wherein the lever arm carrier comprises a pivot that supports the non-straight segment of the lever arm.

51. The vehicle seat suspension of claim 48 wherein the lever arm carrier comprises a roller upon which the non-straight segment of the lever arm rides.

52. The vehicle seat suspension of claim 47 wherein the lever arm carrier extends outwardly of the fluid powered actuator such that the outwardly extending part of the lever arm cantilevers outwardly from the lever arm carrier beyond the lever arm carrier.

53. The vehicle seat suspension of claim 47 wherein there are a pair of spaced part lever arms that each pivotally extend outwardly from the upright and the saddle comprises a pair of lever arm carriers that support a respective one of the lever arms in a manner enabling relative movement therebetween.

54. The vehicle seat suspension of claim 45 wherein the lever arm has a non-straight segment spaced from the upright that operably cooperates with the fluid powered actuator, wherein the fluid powered actuator comprises a generally cylindrical generally vertically oriented air spring, and wherein the non-straight segment is configured to ensure generally vertical translation of the air spring.

55. The vehicle seat suspension of claim 54 wherein the non-straight segment of the lever arm comprises a curved segment.

56. The vehicle seat suspension of claim 45 wherein the suspension linkage comprises a scissors linkage having a pair of spaced apart scissor links that each have one scissor arm pivotally connected to another scissor arm with one of the scissor arms of each one of the scissor links pivotally connected to the upright.

* * * * *